United States Patent [19]

Mauk

[11] Patent Number: 4,741,373
[45] Date of Patent: May 3, 1988

[54] VEHICLE WHEEL AND TIRE ARRANGEMENT

[75] Inventor: Gerhard Mauk, Wunstorf, Fed. Rep. of Germany

[73] Assignee: Continental Gummi-Werke Aktiengesellschaft, Hanover, Fed. Rep. of Germany

[21] Appl. No.: 23,921

[22] Filed: Mar. 5, 1987

Related U.S. Application Data

[63] Continuation of Ser. No. 766,026, Aug. 15, 1985, abandoned.

[30] Foreign Application Priority Data

Aug. 18, 1984 [DE] Fed. Rep. of Germany ....... 3430500

[51] Int. Cl.⁴ .............................................. B60C 11/01
[52] U.S. Cl. .............................. 152/209 R; 152/379.5; 152/538
[58] Field of Search ......... 152/209 NT, 209 R, 379.3, 152/379.5, 381.4, 538, 539, 544, DIG. 20, DIG. 9, DIG. 17

[56] References Cited

U.S. PATENT DOCUMENTS

| | | | |
|---|---|---|---|
| 3,976,115 | 8/1976 | Mirtain et al. | 152/538 |
| 4,079,768 | 3/1978 | Verdier | 152/538 X |
| 4,408,647 | 10/1983 | Kuhn et al. | 152/516 |
| 4,425,953 | 1/1984 | Rohde et al. | 152/532 |
| 4,563,042 | 1/1986 | Seitz et al. | 152/379.3 X |

FOREIGN PATENT DOCUMENTS

| | | | |
|---|---|---|---|
| 2355490 | 5/1975 | Fed. Rep. of Germany | 152/379.3 |
| 3237544 | 4/1984 | Fed. Rep. of Germany | 152/381.4 |
| 2030086 | 4/1980 | United Kingdom | 152/379.5 |

Primary Examiner—Donald E. Czaja
Assistant Examiner—Ramon R. Hoch
Attorney, Agent, or Firm—Becker & Becker, Inc.

[57] ABSTRACT

A vehicle wheel and pneumatic tire arrangement. The tire has a radial carcass anchored in the tire beads, a tread strip, respective shoulder-like extensions which are each formed by a step, are disposed on each side of the tread strip, and do not come into contact with the roadway under normal driving conditions, and a belt which extends laterally to within the vicinity of each step extension to such an extent that a given one of the belt portions which is disposed within the vicinity of a given step extension has a width equal to approximately 25–40% of the amount by which the widest part of the tire extends beyond the end of the tread strip at that given step extension. To achieve a low rolling resistance and at the same time a great travel comfort, the beads of the tire are disposed axially inwardly on the rim to such an extent that the beads are disposed completely axially inwardly of the step extensions. Furthermore, the carcass neutral line essentially conforms to the membrane theory in the region of the sidewalls of the tire.

2 Claims, 2 Drawing Sheets

VEHICLE WHEEL AND TIRE ARRANGEMENT

This application is a continuation of application Ser. No. 766,026 filed Aug. 15, 1985.

BACKGROUND OF THE INVENTION

1. Field of the Invention

The present invention relates to a vehicle wheel and pneumatic tire arrangement, which includes a rim on which can be mounted a tire having: a radial carcass anchored in the tire beads; a tread strip; respective shoulder-like extensions which are each formed by a step, are disposed on each side of the tread strip, and do not come into contact with the roadway under normal driving conditions; and a belt which extends laterally to within the vicinity of each step extension to such an extent that a given one of the belt portions which is disposed within the vicinity of a given step extension has a width equal to approximately 25–40% of the amount by which the widest part of the tire extends beyond the end of the tread strip at that given step extension.

2. Description of the Prior Art

A vehicle tire having the aforementioned features is described, for example, in U.S. Pat. Application Ser. No. 599,508 to Rhode filed Apr. 12, 1984, abandoned and now S.N. Pat. No. 835,976 to Rhode filed Mar. 4, 1986 copending herewith and belonging to the assignee of the present application. This tire is already characterized to a great extent by a low rolling resistance, a uniform wear pattern on the tread strip, an improved fatigue strength even in the region of the edges of the belt, and a satisfactorily dynamic elasticity. However, it has been shown, primarily due to the stiffness of the beads and the lower sidewalls, that deflection movements of the sidewalls are still transmitted to a large extent to the tread surface zone, so that an uncoupling or separation between the tread strip region and the sidewall regions is not yet satisfactorily achieved with this heretofore known tire.

An object of the present invention therefore is to provide a vehicle wheel and tire arrangement of the aforementioned general type which eliminates the aforementioned problems, i.e., in which an optimum uncoupling or separation exists in the tire between the tread strip region and the sidewall regions.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
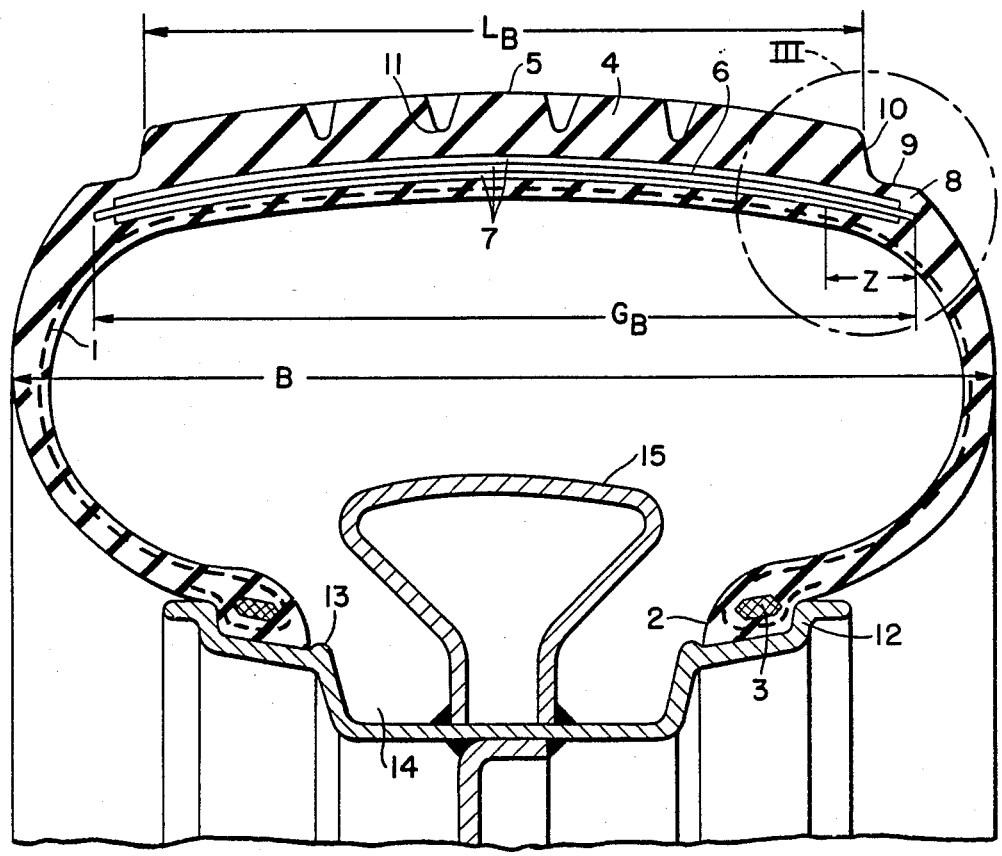
FIG. 1 is a view showing a partial radial section through one inventive embodiment of a vehicle wheel and tire arrangement where the tire beads are disposed on the radially outer side of the rim.

The vehicle wheel and tire arrangement of the present invention is characterized primarily in that the beads of the tire are disposed axially inwardly on the rim to such an extent that the beads are disposed completely axially inwardly of the step extensions, and in that furthermore the carcass neutral line essentially conforms to the membrane theory in the region of the sidewalls of the tire.

Due to the relatively considerable curvature of the tire sidewalls, and due to the flexible, nearly hinge-like-acting attachment of the tire sidewalls, the latter deflect independently, resulting in a considerable increase in the traveling comfort. Due to the marked separation of the tire sidewalls from the tread strip zone, hardly any movement energy is transmitted from the sidewalls to this tread strip zone, so that a significant reduction of the rolling resistance is achieved with the vehicle wheel and tire arrangement of the present invention. The missing bead pressure in the sidewalls leads to greater frictional connection values in the entire region of the tire support surface or tread. This results in greater reliability on wet roads, when braking, during lateral acceleration, and in hydroplaning conditions. Finally, a more uniform and especially lesser wear results.

Even though pursuant to a preferred embodiment of the present invention the tire beads are disposed on the radially inner periphery of the rim, so that during deflection a lateral bulging of the tire can occur without any hindrance from the rim flanges disposed within the interior of the tire, the present invention also has considerable advantages for vehicle wheel and tire arrangements where the tire beads are disposed on the radially outer periphery of the rim. This is achieved primarily due to the extremely flat orientation of the carcass neutral line in the region of the rim flanges, which results in a great bulging of the tire sidewalls and hence results in a deflection condition where the energy is no longer transmitted from the tire sidewalls to the tread strip region.

To enhance this uncoupling or separating action, it is proposed pursuant to a further feature of the present invention to dispose a low-damping rubber layer between two belt plies.

In order to be able to construct the lower sidewall and bead region of the tire with as little material as possible, while having completely satisfactory stability, it is proposed that the carcass neutral line in this region be oriented in such a way that it conforms to the equation of a catenary curve. In so doing, the same considerations apply as were already described in copending U.S. Pat. Application Ser. No. 628,322, Duchow et al filed Jul. 6, 1984, and corresponding allowed Canadian patent application Ser. No. 458,546-Duchow et al filed Jul. 10, 1984 each belonging to the assignee of the present application. This prior application is hereby incorporated into the present application by this reference thereto.

DESCRIPTION OF THE PREFERRED EMBODIMENTS

Figure 2:
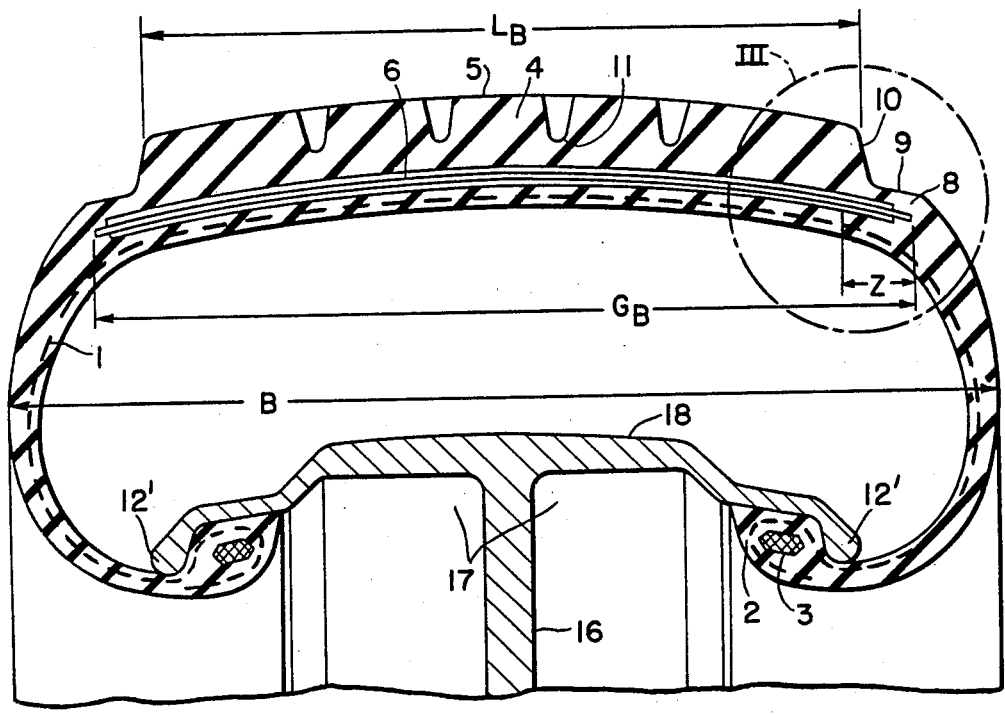
FIG. 2 is a view showing a partial radial section through another inventive embodiment of a vehicle wheel and tire arrangement where the tire beads are disposed on the radially inner side of the rim.

Referring now to the drawings in detail, in the vehicle wheel and tire arrangement of FIGS. 1 and 2, the tire body is made essentially of rubber or rubber-like synthetic material, and has a so-called radial carcass 1, the load-carriers of which are disposed in the known manner in planes radial to the tire. The edges of the carcass 1 are anchored in the tire beads 2 by being looped around bead cores 3.

Disposed between the carcass 1 and a tread strip 4, which is provided with the tread surface 5, there is disposed a belt 6 which is pull-resistant in the circumferential direction of the tire, and which comprises three cord plies 7 disposed one above the other. The load-carriers of a given ply 7 extend parallel to one another, with the load-carriers of adjacent plies 7 extending at an angle relative to one another and to the circumferential direction of the tire. It is to be understood, of course, that all parts of the tire are fixedly vulcanized to one another.

A characteristic of the tire described above is a respective extension portion 8 on each side of the tire body in the shoulder region. Each extension portion 8 is provided with an essentially cylindrical, recessed base 9 which extends approximately parallel to the tread surface 5, and with an approximately vertical step surface 10 which forms one edge of the tread strip 4 and thus determines the width $L_B$ thereof.

The belt 6 is substantially cylindrical or slightly concave, with the base 9 being similarly shaped. The base 9, in turn, is disposed on a diameter which is less than the diameter of the base 11 of the grooves or notches of the tread profiling, and in particular is such that even when the tread is worn, the base 9 does not come into contact with the roadway under normal driving conditions.

The width of the belt 6 is designated with the reference symbol $G_B$, and the greatest width of the tire, measured approximately halfway up the height of the tire cross-section, is designated with the reference symbol B.

The belt 6 extends to the sides into the vicinity of each of the extension portions 8 to such an extent that a portion of the belt disposed in the vicinity of a given extension portion 8 has a width which is approximately 25 to 40%, preferably 30% of that width by which the tire, at its widest location, projects beyond the end of the tread strip 4, so that the following relationship is applicable:

$$0.25 \leq \frac{G_B - L_B}{B - L_B} \leq 0.4$$

This means that in the zone Z, in which the edge of the belt 6 extends at an angle to the carcass 1, is relatively small, and is preferably at most twice the amount by which the edge of the belt extends beyond the vertical step surface 10. In this way, a correspondingly small amount of support rubber in the form of the customary rubber supporting strips suffices. Moreover, a comparatively great bulging results due to the width B of the tire.

It is important that this bulging of the tire sidewall also exists in the lower, i.e., radially inner, half of the tire, so that during the inward deflection of the tire, the tire wall is itself elastic and can deflect, and is not prevented from doing so by the bead pressure of a stiff and steep bead. This is achieved by disposing the beads 2 of the tire axially inwardly on the wheel rim to such an extent that the beads 2 are located completely axially inwardly of the extension portions 8; furthermore, the carcass neutral line is disposed, in the region of the sidewall, in such a way that it essentially conforms to the membrane theory.

In the embodiment illustrated in FIG. 1, the tire beads 2 are disposed on the radially outer periphery of a rigid, one-piece rim next to the radially outwardly extending rim flanges 12. The bases of the relatively flat bead cores 3 extend parallel to the rim seating surfaces, which can be horizontal or slightly inclined. Each tire bead 2 is secured axially inwardly by a so-called hump 13, axially inwardly of, and next to, each of which there is provided a respective well 14 for mounting the tire. Located in the central portion of the rim on the radially outer side thereof is a support member 15 which determines the greatest diameter of the rim and serves for supporting the tire during an emergency operation.

In the embodiment of FIG. 2, the tire beads 2 are disposed on the radially inner periphery of a rigid, one-piece rim next to the essentially radially inwardly extending rim flanges 12'. Deep beds 17 disposed on both sides of the rim portion 16 make it possible to mount the tire. The radially outwardly disposed part of the rim ring in the region of the deep beds 17 serves as the support surface 18 for the tire during an emergency operation.

The carcass neutral lines of the embodiments of FIGS. 1 and 2 can be disposed in such a way that they conform to the equation of a catenary curve in the region of the rim flanges.

Figure 3:
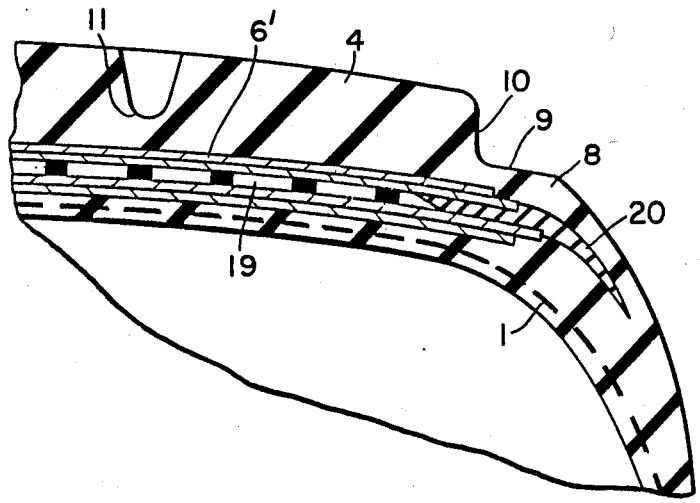
FIG. 3 is a view showing a partial radial section of a portion of a tire as it could be embodied in the dot-dash encircled portion III of the arrangement of FIGS. 1 or 2, with a low-damping rubber layer being disposed between two plies of a four-ply belt.

The tire illustrated in FIG. 3 can be used with each of the previously described vehicle wheel and tire arrangements. This tire is distinguished by a low-damping rubber layer 19 which is disposed between the two middle plies of a four-ply belt 6'. The rubber layer 19 should not be thicker than at most 5 mm. Furthermore, the rubber layer 19 extends toward the sides to approximately below the edges of the tread strip 4; from there, a respective edge strip or portion 20 of a harder rubber mixture extends to beyond the extension portion 8. Suitable hardnesses for the softer rubber layer 19 are in the range of 40 to 50 Shore A, while the edge portions 20 can have a hardness of 58 to 80 Shore A.

It should be noted that although the previously described vehicle wheel and tire arrangements are preferably provided for use with trucks, the present invention is in no way limited to such an application.

The edge portions 20 preferably have a rebound elasticity of approximately 40 to 50%, as measured pursuant to DIN (German Industrial Norm) 53512, while the rebound elasticity of the rubber layer 19 should be 60 to 70%. In this connection, the rebound elasticities of the rubber mixtures which surround the belt 6 should essentially correspond to the elasticity of the edge strips 20.

The present invention is, of course, in no way restricted to the specific disclosure of the specification and drawings, but also encompasses any modifications within the scope of the appended claims.

What I claim is:

1. A vehicle wheel and pneumatic tire arrangement, which includes a rim on which can be be mounted a tire having: a radial carcass which has a neutral line with extremely flat orientation and is anchored in the tire beads; sidewalls having a predetermined uniformly thin thickness; a tread strip; respective shoulder-like widening step extensions which are each formed by a step, are disposed on each side of said tread strip, and do not come into contact with the roadway under normal driving conditions; and a belt which extends laterally beyond the ends of the tread strip to within the vicinity of each widening step extension to such an extent that a given one of said belt portions which is disposed within the vicinity of a given one of said step extensions extends laterally beyond the ends of the tread strip a total distance equal to approximately 25–40% of the total amount by which a widest part of said tire extends beyond the sides of said tread strip which are adjacent to said given step extensions;

the improvement in combination therewith comprising an arrangement wherein said beads of said tire are disposed axially inwardly on said rim to such an extent that said beads are disposed completely axially inwardly of said widening step extensions; and wherein furthermore said carcass neutral line essentially conforms to the membrane theory in the region of said sidewalls of said tire, said sidewalls having relatively considerable curvature and deflecting independently due to flexible nearly hinge-like-acting attachment of the tire sidewalls between said tread strip and said beads; said rim having a support member including a support surface radially inwardly of said tread strip and having essentially radially inwardly extending rim flanges; said tire beads being disposed on the radially inner periphery of said rim next to said rim flanges so that during deflection a lateral bulging of the tire can occur without any hindrance from the rim flanges disposed within the interior of the tire and primarily due to extremely flat orientation of the carcass neutral line in the region of the rim flanges, there results a great bulging and hence a deflection condition wherein energy is no longer transmitted from the tire sidewalls to said tread strip; said carcass of a mounted tire, in the vicinity of said rim flanges, extending essentially horizontally, with said carcass neutral line, in this region, conforming to the equation of a catenary curve; the thickness of a given one of said sidewalls of said tire being approximately uniform from the widest part of said tire to the region of the associated rim flange due to construction of a lower sidewall and bead region of the tire with as little material as possible yet having completely satisfactory stability.

2. A wheel and tire arrangement in combination according to claim 1, in which said belt comprises a plurality of plies having load-carriers; which includes a low-damping rubber layer having a hardness in a range of 40 to 50 Shore A having a rebound elasticity of approximately 60 to 70% disposed between two of said belt plies, said rubber layer having a thickness corresponding at least approximately to the diameter of said load-carriers, though not exceeding at most 5 mm; said rubber layer extends toward both sides of said tire approximately to the vicinity of the edges of said tread strip; and which includes a respective edge portion as a continuation of the edges of said rubber layer; each of said edge portions is comprised of a rubber mixture having a hardness in a range of 58 to 80 Shore A which is harder than said rubber layer, and each of said edge portions has a rebound elasticity of approximately 40 to 50% and extends laterally to beyond a given one of said step extensions.

* * * * *